United States Patent [19]
Dall'Asta et al.

[11] 3,907,934
[45] Sept. 23, 1975

[54] HIGH IMPACT COMPOSITIONS OF PVC AND CHLORINATED POLYALKENAMERS

[75] Inventors: Gino Dall'Asta; Pietro Meneghini, both of Milan, Italy

[73] Assignee: Montecatini Edison S.p.A., Milan, Italy

[22] Filed: Jan. 4, 1974

[21] Appl. No.: 430,890

Related U.S. Application Data

[63] Continuation-in-part of Ser. No. 218,556, Jan. 17, 1972, Pat. No. 3,798,291, which is a continuation of Ser. No. 870,424, Oct. 21, 1969, abandoned.

[30] Foreign Application Priority Data
Oct. 21, 1968  Italy.................................. 22766/68

[52] U.S. Cl........ 260/899; 260/23 XA; 260/30.4 R; 260/32.8 R; 260/33.8 UA; 260/45.75 K; 260/93.1

[51] Int. Cl.$^2$......................................... C08F 29/24
[58] Field of Search........................ 260/897 C, 899

[56] References Cited
UNITED STATES PATENTS
3,396,211   8/1968   Bonotto et al...................... 260/897

*Primary Examiner*—Stanford M. Levin

[57] ABSTRACT

Compositions of PVC and chlorinated polyalkenamers having a markedly improved resistance to impact of the PVC are obtained. These compositions are suitable for the extrusion of manufactured articles having high resistance to bursting, for injection molding or blowing of articles having a high clarity, good processability and impact properties.

4 Claims, No Drawings

HIGH IMPACT COMPOSITIONS OF PVC AND CHLORINATED POLYALKENAMERS

This application is a continuation-in-part of application Ser. No. 218,556, filed Jan. 17, 1972, now U.S. Pat. No. 3,798,291, which is in turn a continuation of application Ser. No. 870,424, filed Oct. 21, 1969 now abandoned.

THE PRIOR ART

The importance of halogenated polyhydrocarbons, such as, e.g., polyvinyl chloride, in the field of plastic materials, is well known.

Although it has many advantages, polyvinyl chloride has two considerable drawbacks: (1) its relatively high (around 70°C) glass transition temperature (Tg), a property which makes it rather brittle and poorly resistant to impact at low temperatures; and (2) its chemical instability, particularly at the high tempertures required to process it, and which is manifested by the loss of hydrochloric acid and yellowing of the polymer.

These drawbacks of polyvinyl chloride can be remedied only partly. It has long been known that it is possible to increase the impact value of rigid (not plasticized) PVC by incorporation therein of rubbery or polymeric materials having a glass transition temperature below 0°C. The procedure for increasing the impact value consists of mixing or blending rigid PVC with an amount of elasticizing agent of about 5-20% together with conventional stabilizers and lubricants. The materials most suitable for this purpose are: chlorinated polyethylene, acrylic polymers, butadiene-acrylonitrile copolymers, and the butadiene rubber grafted with styrene, acrylonitrile or acrylate monomers (ABS, MBS), ethylene-vinyl acetate copolymers and the grafted copolymers thereof. These materials, however, exhibit at least one of the following drawbacks:

a. insufficient compatibility with PVC wherefrom opacity of the composition originates, midiocre superficial characteristics of the manufactured products and sometimes poor processability with no reproducibility of the mechanical characteristics.

b. insufficient reinforcing effect at the low temperatures, whereby there are necessary high amounts of modifier.

c. a too high plasticizing effect with a decrease of the modulus and of the Vicat point.

It has also been proposed to avoid the high glass transition temperature and chemical instability under heating by using chlorinated polyethylene instead of polyvinyl chloride. The chlorinated polyethylene can be obtained by reacting chlorine with polyethylene, and its chlorine content can be adjusted easily by controlling the amount of chlorine caused to react with polyethylene. However, the mechanical properties of the chlorinated polyethylenes are inferior to those of polyvinyl chloride and, therefore, the chlorinated polyethylenes are satisfactory and acceptable substitutes for polyvinyl chloride for only a few applications.

THE PRESENT INVENTION

We have now found that a high impact material now showing the drawbacks due to the use of the elasticizing agents of the prior art can be formed by blending and molding a PVC selected from the group consisting of conventional rigid PVC, syndiotactic PVC and copolymers of vinyl chloride with up to 30% by weight of vinyl acetate, vinyl maleate, vinyl pivalate or propylene, with a chlorinated polyalkenamer that is partially or completely chlorinated on the double bonds, having a chlorine content of 20 to 51% by weight and in which the chlorine atoms are linked to two adjacent carbon atoms belonging to units having the structure —CHCl — CHCl — (CH$_2$)$_n$— in which n is a whole number from 3 to 10, containing a double bond content of 0 to 5 double bonds per 100 carbon to carbon bonds. The sections are randomly or block distributed along the chain. The block structure is the preferred one because it confers to the modified polyalkenamer an elasto-plastic nature.

The high impact polymeric material obtained according to this invention shows a good compatibility between the chlorinated polyalkenamer and the PVC, and excellent thermoplastic behaviour, and good optical and mechanical characteristics. The optical properties depend upon the chlorine content of the polyalkenamer. Generally, the compositions show good transparency the higher the chlorine content is. For instance the compositions containing chlorinated polypentenamer are transparent in correspondence of chlorine contents from 40% to 50% by weight. The thermal resistance of the compositions generally increases as the chlorine content decreases. The mechanical properties are good along the whole chlorine range. As far as the impact resistance at low temperatures is concerned, the best results are obtained with the chlorinated polypentenamers.

Compounding ingredients such as conventional stabilizers or lubricants may be incorporated into the compositions of this invention.

The chlorinated polyalkenamers useful for the composition of this invention have an intrinsic viscosity in cyclohexanone at 30°C, comprised between 1 and 10 dl/g. They are insoluble in carbon tetrachloride, even at the boiling point and are insoluble at room temperature in aliphatic and cycloaliphatic hydrocarbons, in low-boiling alcohols and in low-boiling ketones whereas they are soluble in methylene chloride, chloroform, tetrahydrofuran and high-boiling ketones.

When the sections containing the chlorine atoms form blocks along the polymer chain, they are linked in a head-to-tail enchainment.

The chlorinated polyalkenamers are obtained by reacting the starting polyalkenamer, the monomeric unit of which is essentially —CH=CH(—CH$_2$)$_n$— in which n is from 3 to 10 and in which essentially all the monomeric units are linked together in a head-to-tail enchainment, is solution, for example in methylene chloride or an aromatic hydrocarbon solvent such as benzene, with chlorine either undiluted or dissolved in the solvents mentioned, at temperatures in the range from −80°C to +150°C, the reaction being continued until the content of chlorine introduced by addition on the double bonds of the polyalkenamer is from 20 to 100% of the available double bonds. The addition of chlorine takes place essentially on the double bond, as can be determined by elemental analysis and by examination of the infra-red spectrum which is different from that of a differently halogenated polyalkenamer. As explained, the chlorine atoms are distributed on the double bonds either randomly or sequentially in the sense that they are present alternately along sequences of the chain.

The halogen added to the double bonds of the starting polyalkenamer is normally used in the elemental state, e.g., by bubbling a stream of chlorine into a solution of the polyalkenamer, or by adding a solution of chlorine, or the liquid chlorine per se, dropwise to the solution of the polyalkenamer, with vigorous stirring of the latter.

In general, it is preferred to carry out the reaction of chlorine with the polyalkenamer, at low temperature, in order to avoid undesired side reactions such as dehydro-chlorination.

Preferably, the solution of the polyalkenamer in methylene chloride has a concentration of from 0.5% to 5.0%.

At the end of the reaction, the halogenated polymer is normally coagulated by pouring the reaction mixture into methanol. The halogenated polymer is separated and dried, the solvent being recovered by distillation. Before the polymer is hot-processed, it can be stabilized by incorporating in it a small quantity of a stabilizer, for example, of dibutyl tin mercaptyl.

As previously mentioned, the chlorinated polyalkenamers may have a chlorine content from 20 to 51% by weight. The characteristics of the polyalkenamers completely chlorinated on the double bonds are shown in the following Table 1. When polyalkenamers from polypentenamers to polyheptenamers are used, the chlorine content varies from 20% to 51% and from 20% to 42.5% by weight respectively. At the bottom of the Table 1 are given for comparison purposes the characteristics of chlorinated polyethylene and of polyvinylchloride.

TABLE 1

| Chlorinated polymer | % chlorine by weight | $[\eta](*)$ | Density g/cc | $T_g$ (°C) |
|---|---|---|---|---|
| Polypentenamer | 51 | 1–4 | 1.4 | 20–23 |
| Polyheptenamer | 42.5 | " | 1.3 | −15 |
| Polyoctenamer | 39.2 | " | 1.25 | −18 |
| Polydecenamer | 34 | " | 1.15 | −30 |
| Polydodecenamer | 30 | " | 1.1 | −35 |
| Chlorinated polyethylene | 35–45 | | 1.1–1.25 | −5 to +10 |
| Polyvinyl-chloride | 56 | 0.5–1.0 | 1.41 | 83 |

(*)in cyclohexanone at 30°C

The starting polyalkenamers to be chlorinated and used in that form in the compositions of this invention, can be obtained by processes described in U.S. Pat. Nos. 3,459,725 and 3,449,310 and in U.S. Pat applications Ser. Nos. 787,622; 587,652/60 and 652,719/60; or by G. Natta, A. Zambelli, I. Pasquon and P. Ciampelli in their paper published in Makromolekulare Chemie, Vol. 79, 161 (1964) or in Jr. Polymer Science, Part A-1, Vol. 5, pp. 2209 – 2217 (1967).

The starting polyalkenamers are either highly stereoregular, i.e., polyalkenamers in which the double bonds of substantially all of the monomeric units are of the cis type, or of the trans type; or are atactic polyalkenamers containing considerable quantities of both cis- and trans-internal double bonds.

Preferably, the starting polyalkenamers have a high molecular weight corresponding to an intrinsic viscosity, in cyclohexanone, higher then 0.5 dl/g.

The rigid PVC used in the compositions of this invention can be prepared by suspension polymerization and has a Fikentscher's K value of from 45 to 90 (according to DIN 53726) i.e., molecular weight corresponding to an intrinsic viscosity in cyclohexanone at 30°C between 0.5 and 1.4 dl/g.

The syndiotactic PVC used in the composition of this invention can be obtained according to the process of British Patents 944,741 and 1,043,026 and of U.S. Pat. Nos. 3,409,601 and 3,255,168. This polyvinyl chloride has a tacticity index from 2 to 2.5 (according to Fordham, Journal Pol. Sciences 41,(1959)73, a Tg between 95° and 105°C and a thermal stability at 180°C in nitrogen lower than 0.5 millimols of HCL per gram per minute.

The above PVC materials are employed using conventional stabilizing and lubricating recipes.

The following examples are given to illustrate the invention and are not intended to be limiting. In the examples the parts where not otherwise specified are intended by weight.

EXAMPLE 1 (Preparation of poly(dichloro-octenamer))

10 g of polyoctenamer consisting of 45% trans-octenamer units and 55% cis-octenamer units, and having an intrinsic viscosity of 0.5 dl/g in cyclohexanone at 30°C are dissolved in 800 ml methylene chloride in a 3 liter flask provided with a mechanical stirrer, a thermometer and an inlet for feeding the reactants. The solution is cooled down to −20°C and 8 ml of liquid chlorine, technical grade, dissolved in 250 ml methylene chloride are added under stirring by means of a dropping funnel cooled down to −80°C. The chlorine solution is dropped into the flask in 15 minutes and the reaction is carried on for another 15 minutes at 0°C and the polymer is coagulated in methanol.

14 g of a white, elastic product having a chlorine content of 39.4% by weight are obtained. The polymer is soluble at 20°C in chloroform, methylene chloride, tetrahydrofuran and cyclohexanone, and insoluble, even at the boiling point, in carbon tetrachloride and aromatic solvents. It is atactic. The density is 1.27 g/cm$^3$. The intrinsic viscosity in cyclohexanone at 30°C is 1.69 dl/g. Its glass transition temperature (Tg) =−20°C. The product has the structure of a poly(1,2-dichloro-octenamer).

EXAMPLE 2

A mixture of 17.5 parts by weight of the chlorinated polyoctenamer prepared according to Example 1 and 82.5 parts by weight of polyvinyl chloride was prepared by mechanical mixing on a roll mixer.

The IZOD resilience (with notch, ASTM D 256-56) of this mixture is 92± 1 kg x cm/cm (against a value of 3.2 kg x cm/cm for the same unmodified polyvinyl chloride). The hardness (Rockwell method, R scale, ASTM D 785/65) is 90 (unmodified polyvinyl chloride 32 100).

EXAMPLE 3 AND COMPARATIVE EXAMPLES 1 AND 2 a. In a Bambury type mixer (Pomini - Farrell Midget type) 340 g of commercial PVC powder having a Fitkentscher K value 32 63 ± 1 are mixed with 60 grams of a chlorinated 80% trans polyoctenamer (obtained by chlorination with gaseous chlorine of 80% trans polyoctenamer dissolved in methylene chloride) and having a chlorine content of 39% by weight and and intrinsic viscosity in cyclohexanone at 30°C of 2.0 b. 340 g of commercial PVC powder having the same characteristics as defined in a) are mixed under the same conditions as in a) with 60 grams of a chlorinated polyethylene having a chlorine content of 38% by by weight and intrinsic viscosity in cyclohexanone of 3.1 and a glass transition of −5°/+5°C, in the presence of 1.5 grams of a stabilizer based on tin mercaptide (Mark 292 - Trademark).

The above two blends are obtained by masticating each at a temperature of 180°–185°C for 4 minutes, with a motor speed of about 150 r.p.m. The two blends are then discharged and then, after cooling, ground into pellets. The two compositions are compression molded under the same conditions as the rigid PVC is molded, in plates of 3.0 mm thickness at temperatures of 190°–200°C for 5 minutes and then cooled in the press. After standing overnight at room temperature, specimens are obtained for the mechanical and optical tests whose results are reported in Table 2.

having a content of 85% (at the I.R.) trans double bonds by chlorination in methylene chloride solution up to a chlorine content in the chain varying from 20 to 50% by weight. To the blend are added small amounts of stabilizers based on barium and cadmium(-Mark WSX-trademarks) 1.5 phr and a chelating agent (Mark C) 0.5 phr (parts %) and 0.1 phr of a stabilizer Irganox 1093 (Trademark) that protects the partially chlorinated diene rubber from oxidative degradation.

The blends are compression molded into plates of 0.5 and 3.0 mm at 185°± 5°C for 5 minutes and cooled in the press at a rate of 3°C per minute. After a suitable conditioning of the plates (24 hours at 23°C, relative humidity 60%), optical and mechainal tests are carried out on the specimen obtained therefrom, according to the ASTM specifications.

The thus obtained blends furnish molded PVC having always high rigidity, good processability and resistance to impact (deducible from the stress-strain data at the

TABLE 2

| Example | Blends PVC-plasticizer ratio 85–15 | Degree of fluidity at 185°C-23.5 Kg (ASTM D 1238) g in 10′ | Rockwell Hardness at 23°C (ASTM D 785) scale L | Flexural modulus at 23°C (ASTM D 638) kg/cm² | Resistance to impact Izod with notch (ASTM D 256) cm Kg/cm 23°C | 0°C | Transparency (ASTM D 1003) % |
|---|---|---|---|---|---|---|---|
| 3 | PVC+chlorinated polyoctenamer (39% Cl) | 2.5 | 75 | 22,000 | >100 | 20 | >90 |
| comparative example 1 | PVC+chlorinated polyethylene (38% Cl) | 0.1–0.4 | 80 | 25,000 | 15 | 6 | >90 |
| comparative example 2 | PVC homopolymer | 0.1–0.2 | 90 | 28,000 | 2–3 | 1 | >90 |

EXAMPLES 4, 5, 6, 7, 8 AND COMPARATIVE EXAMPLE 3

The same commercial PVC as defined in example 3 is mixed in an open 2 roll mixer at temperature of 170°±5°C per five minutes with each of the not chlorinated and respectively partially chlorinated polypentenamer (containing respectively 21, 33, 43 and 49,6% by weight chlorine), in the ratio by weight of 85.15. The partially chlorinated polypentenamers containing respectively 21, 33, 43 and 49.6% chlorine are obtained from a commercial 1, 4 trans polypentenamer speed of 100 mm/minute and from the characteristics of optical transparency which depend upon the chlorine content of the elasticizing agent. The thus modified PVC, depending on the type and the content of the elasticizing agents are suitable for the extrusion of tubes having high resistance to bursting and respectively to injection molded and blowed objects (plates, bottles, etc.) having a high clarity and good impact characteristics.

The mechanical, optical and thermal characteristics of the PVC-chlorinated polypentenamer are reported in Table 3.

TABLE 3

Mechanical, optical and thermal characteristics of blends PVC-chlorinated polypentenamer (ratio 85:15) on compression molded specimens of 0.5 mm thickness

| Ex. | Blends PVC - polypentenamer (PP) ratio 85 – 15 | Stress-strain data[1] (ASTM D638) | | | Optical properties (ASTM D1003-61) | | Thermal resistance of the blend in air (30′ at 185°C) | | | |
|---|---|---|---|---|---|---|---|---|---|---|
| | | $\sigma_R$ Kg/cm² | $\epsilon_R$ % | $L_R$[2] kg cm/cm³ | Transparence % | Haze % | % insoluble (cyclohexanone) TQ | Stabil.[4] | T[3]a 4500 A° TQ | Stabil.[4] |
| 4 | PVC + PP (85% trans) | 340 | 6 | 8.2 | 67 | 100 | 12.9 | 3.3 | 94.8 | 96.3 |
| 5 | PVC + PPCl (21% Cl) | 400 | 43 | 144 | 62.3 | 95 | 7.8 | 4.7 | 95.2 | 96.5 |
| 6 | PVC + PPCl (35% Cl) | 465 | 39 | 142 | — | — | — | — | — | — |
| 7 | PVC + PPCl (43% Cl) | 550 | 33 | 140 | 75.4 | 20 | 9.7 | 8 | 94.2 | 97.5 |
| 8 | PVC + PPCl (49,6% Cl) | 530 | 26 | 105 | 75.7 | 15 | 7.1 | 3.4 | 97.2 | 98.5 |
| comparative ex. 3 | PVC homopolymer | 590 | 6 | 17.5 | 75.5 | 19 | traces | 0 | 95.5 | 98.0 |

[1]rate of elongation = 100 mm/min.
[2]breck energy
[3]transmittance in solution (centrifuged) of 0.5%
[4]1.5% Mark WSX + 1.5% Mark C + 0.1% Irganox 1076

EXAMPLES 9, 10, 11 AND COMPARATIVE EXAMPLE 4

The same commercial PVC as in example 3 is mixed in an open 2 roll mixer with a chlorinated polyalkenamer (ratio 80:20) at the temperature of 180°± 5°C for 5 minutes, and more specifically with a. the chlorinated polyoctenamer as defined in example 1, and respectively with b. the chlorinated polypentenamer having 21% by weight chlorine, and c. the chlorinated polypentenamer having 35% by weight chlorine.

The above blends contain also 1.5 phr of thiostannic stabilizer Mark 292 (Trademark) and 0.1 phr. of bisphenol antioxydant Irganox 1076 (Trademark) and lubrified with 1.0 phr of stearic acid. The calandered sheets, after cooling, are ground into pellets which are molded in the same conditions as described in example 3 in plates of 3.0 mm thickness. From the plates there are obtained specimens with notch for the tests of impact resistance IZOD (ASTM D 256) at different temperatures. Before the test the specimens are conditioned for two hours in thermostatic bath. The results are reported in Table 4 together with a comparative test with a sample of not elasticized PVC.

EXAMPLES 12, 13, 14, 15 AND COMPARATIVE EXAMPLE 5

A sample of syndiotactic PVC, obtained by low temperature polymerization with the redox system, having a density at 23°C of 1.41, a viscosity in cyclohexanone at 30°C of 1.4 and a thermal stability corresponding to a loss of HCl lower than 1 eq/kg at 180°C after two hours, is mixed in an open mill at the temperature of 190°C for 5 minutes in ratios of 85 : 15 and 80 : 20 with a chlorinated polypentenamer having a chlorine content of 43% and with a chlorinated polyethylene grafted with a commercial vinylchloride (Hostalit H of the Hoechst-Trademark).

The blends contain also small amounts (3.0 phr) of stabilizer based on organo stannic derivatives (Mark 292-Trademark) and in example 13 of processing aids of polyacrylic type (Paraloid K 120 N - Trademark).

The main effect of the addition of these elasticizing agents is a remarkable improvement in obtaining a continuous sheet on the mixer and of the elasticity characteristics of the melt.

The mixes are discharged after 5 minutes, cooled and ground to pellets. These are compression molded at 195°± 5°C into plates of 1.0 to 3.0 mm thickness for 4 minutes and cooled in press. From the plates there are obtained specimens according to ASTM specifications for the optical and mechanical tests. The results are reported in Table 5 together with a comparative test with a sample of not elasticized syndiotactic PVC.

TABLE 4

| Example | Blends PVC - chlorinated polyalkenamers ratio 80/20 | Impact resistance Izod with notch cm Kg/cm | | | |
|---|---|---|---|---|---|
| | | 23°C | 0°C | −15°C | −30°C |
| 9 | PVC + Chlorinated Polyoctenamer (39,4% Cl) | >100 | 20 | 7 | 3 |
| 10 | PVC + chlorinated polypentenamer (21% Cl) | 80 | 18 | 13 | 11 |
| 11 | PVC + chlorinated polypentenamer (35% Cl) | 20 | 13 | 10 | 8 |
| comparative example 4 | PVC homopolymer | 2–3 | 1.52 | ≤1.5 | ≤1.5 |

TABLE 5

| Ex. | Sample | Modif. % weight | Formation time of sheet at 190°C min. | Flex. Modulus 23°C Kg/cm² | Impact resistance cm.Kg/cm | Transparency % |
|---|---|---|---|---|---|---|
| 12 | PVC+chlorinated polypentenamer | 15 | 2 | about 30,000 | 2–4 | >90 |
| 13 | PVC+PPC+Paraloid | 15+8 | 1 | — | 9.5 | 85 |
| 14 | PVC+Hostalit H | 10 | 0.5 | 26,000 | 2.5 | 85 |
| 15 | PVC+Hostalit H | 20 | 0.5 | 25,000 | 13 | 80 |
| Comparative Ex. 5 | Syndiotactic PVC | — | it does not form | higher than 30,000 | brittle | >90 |

EXAMPLE 16

A sample of 85% trans polypentenamer is dissolved in methylene chloride at 7.5 parts percent by weight and from this solution there is obtained, in the presence of a not ionic emulsifier, an aqueous emulsion of the elastomer having a diameter of the particles of about 0.5 microns.

The thus emulsified elastomer is crosslinked gently by treatment at 80°C with a solution of benzoyl peroxide in methylene chloride. This preparation is carried out according to the well known techniques of grafting such as for example those described by Minoua in Makromolekulare Chemie 24 (1957) 205.

After removing by stripping the most part of the solvent, the emulsion is subjected to a chlorination treatment with gaseous chlorine. The chlorination is carried out up to a chlorine consumption corresponding to 40% and respectively 60% by weight of the calculated of one chlorine mol per double bond. After removing the unreacted chlorine by stripping with nitrogen, the latex is treated with a coagulant (methanol or a calcium salt) so as to recover the elasticizing agent in powder form that can be easily separated by centrifuging or filtration from the slurry. The powder is dried and mixed in a Henschel mixer (1800 r.p.m.) at a temperature from 60° to 80°C for 10 minutes with the same PVC as in example 3 together with the stabilizing or lubricating agents described in example 3.

The discharged blend is transformed in a screw extruder L/D 20 at about 160°–190°C into a transparent tape having 2.0 cm width and about 0.2 mm thickness. This manufactured product exhibits a high resistance to impact and bending, good rigidity characteristics (flexural modulus at 23°C of 26,000 kg/cm$^2$) and a good temperature of distortion under heat at 75°C (Vicat degree at 1 kg). The extruded composition is particularly suitable for molding under vacuum.

We claim:
1. Compositions of PVC comprising
   a. a vinyl chloride polymer selected from the group consisting of vinyl chloride homopolymer having a Fikentscher K value from 45 to 90 and copolymers of vinyl chloride with up to 30% by weight of vinylacetate, vinyl maleate, vinyl pivalate or propylene having a Fikentscher K value from 45 to 90, and
   b. from 5 to 30% by weight, on the composition weight of a chlorinated polyalkenamer having a chlorine content of 20 to 51% by weight and in which the chlorine atoms are linked to two adjacent carbon atoms belonging to units having the structure —CHCl — CHCl — (CH$_2$)$_n$— *wherein* $n$ is a whole number from 3 to 10, containing a double bond content of 0 to 5 double bonds per 100 carbon-to- carbon bonds.

2. The compositions of claim 1, in which the polyvinylchloride is syndiotactic polyvinylchloride having a tacticity index from 2 to 2.5.

3. The compositions of claim 1, containing conventional stabilizers and lubricants.

4. The compositions of claim 1, in which b) is a chlorinated polypentenamer.

* * * * *

UNITED STATES PATENT OFFICE
CERTIFICATE OF CORRECTION

PATENT NO. : 3,907,934
DATED : September 23, 1975
INVENTOR(S) : Gino Dall'Asta et al It is certified that error appears in the above-identified patent and that said Letters Patent are hereby corrected as shown below:

Col. 1, line 38, change "midiocre" to - - -mediocre- - -.

Col. 4, line 2 of Example 1, change "trans-octanamer" to

- - -trans-octenamer- - -;

line 56, change "(unmodified polyvinyl chloride 32 100)" to

- - -unmodified polyvinyl chloride ≡ 100)- - -;

line 3 of Example 3, change "value 32   63-1" to

- - -value ≡ 63 - 1 - - -;

line 7 of Example 3, change "39% by weight and and" to

- - -39% by weight and an- - -.

$$\text{Signed and Sealed this}$$

twenty-seventh Day of January 1976

[SEAL]

Attest:

RUTH C. MASON
*Attesting Officer*

C. MARSHALL DANN
*Commissioner of Patents and Trademarks*